June 26, 1923.  1,459,941

E. WESNIGK

ADJUSTABLE PROPELLER NAVE

Filed Aug. 17, 1921

Witnesses:

Inventor:

Patented June 26, 1923.

1,459,941

UNITED STATES PATENT OFFICE.

ERWIN WESNIGK, OF BERLIN, GERMANY.

ADJUSTABLE PROPELLER NAVE.

Application filed August 17, 1921. Serial No. 493,122.

*To all whom it may concern:*

Be it known that I, ERWIN WESNIGK, engineer, a citizen of the Commonwealth of Germany, have invented certain new and useful Improvements in Adjustable Propeller Naves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to adjustable air propellers and more particularly to the bearings of the rotary blades at the nave and to the formation of the nave parts for this purpose.

The essential feature of the invention consists in that a nave member in the form of a plate is mounted upon the propeller shaft and carries the freely mounted blade bearings which are fixed by securing bolts passing outside the nave member or which are connected to each other. By this arrangement the mounting and dismounting of the blades is greatly facilitated and can be rapidly carried out, no complicated constructional parts being required as the whole nave is composed of a plate, two rings, and a few bolts.

Another important feature consists in the large surfaces offered by the plate-like nave for the formation of a large thrust bearing acting similarly to a rotary disc, which by means of its great diameter not only transmits the centrifugal forces of the blades but also takes up the bending strains produced by the thrust, so that the resultant of the thrust and centrifugal force in normal running passes within the circumference of the thrust bearing. This large thrust bearing is preferably formed with ball bearings in order to offer, in spite of its size, only slight resistance to the adjusting apparatus. Propellers have already been proposed in which thrust bearings are arranged on the blades but these were only adapted to take up the centrifugal forces while, for taking the bending forces, other bearings were made use of. With the improved thrust bearing on the contrary all the forces are taken up in the single bearing and the blades are thereby supported completely free from play or lost motion.

The large ring-shaped thrust bearing is made specially advantageous by being arranged at the widest end of a metal shaft socket widened out towards the nave, in which the wooden blade is fixed by expanding it by means of a wedge driven in from the free side. The considerably widened form of the shaft socket affords good transmission of the forces from the large bearing to the much thinner blade shaft; further, the longitudinal axes of the thrust bearing and of the blade fixing coincide with one another, as is also the case with known propellers, so that a particularly small total diameter of the propeller nave is obtained.

The improved adjustable propeller nave is shown in the accompanying drawings in which—

Figure 1:
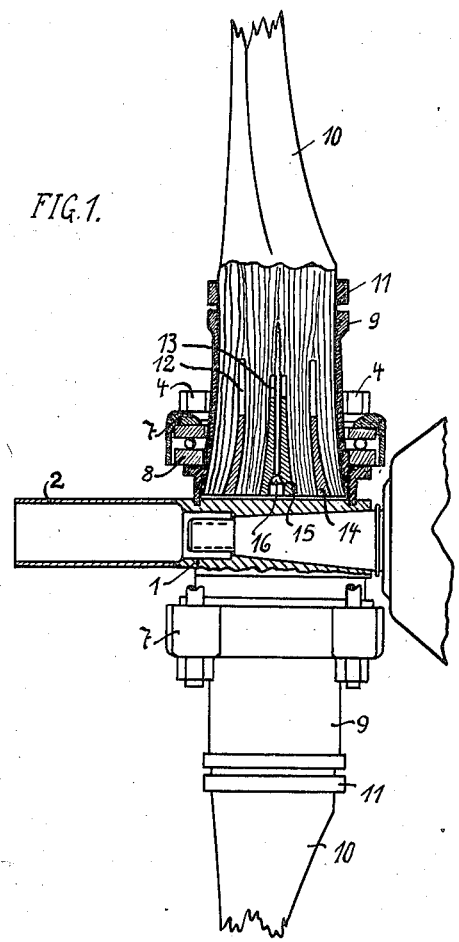
Fig. 1 is a side view partially broken away.
Figure 3:
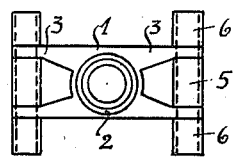
Fig. 3 is a front detail view of the central part of the nave.
Figure 2:
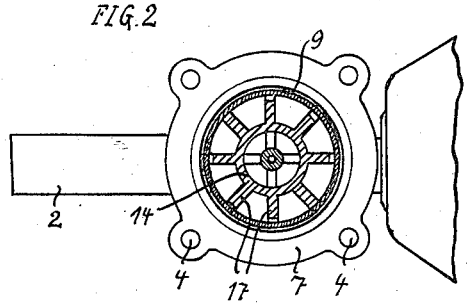
Fig. 2 is a section through a blade shaft showing the nave.

Referring to the drawings, the nave 1 is a flat member to which a socket 2 is screwed and in this socket the nut securing the shaft is accompanied, while upon the outer periphery of the said member any desired apparatus for the adjustment of the blades can be mounted. The nave 1 is formed of two parallel plates 3 which serve as abutment surfaces for the propeller blades. For retaining the blades securing bolts 4 are provided which between the nave plates are surrounded by stiffening sleeves 5 and outside by distance sleeves 6, so that the outer carrier rings 7 held by these bolts 4 are completely secured in position relatively to the nave 2, 3. These carrier rings 7 are combined with steel sockets 9 which take the blades 10 and are provided with ball bearings 8, these sockets being widened towards the centre of the nave similarly to cones, so that they pass from the diameter of the blade shafts to the large diameter of the thrust bearing.

The wooden blades 10 are secured against bursting by shrinking rings 11 and are fixed in the sockets 9 by expansion as follows. Annular slots 12 are provided in the faces of the blade shafts (of which slots several may be provided arranged concentrically one within the other when using thicker blades) and a central boring 13 is made. In addition radial slots are formed in the blade foot. In these slots a ring wedge 14 is driven which presses the wood by expansion against the walls of the socket 9 and in the centre a wedge shaped bolt 15 is driven in so as to press the wooden fibres surrounding it against the ring wedge 14, the bolt 15 being rigidly held in the wood against accidental loosening by means of a screw 16.

The annular wedge 14 has ribs 17 which engage in the radial slots in the wood to be expanded, so that it forms the slotted section into one solid shank.

The steel socket 9 has at the end adjacent the nave 2, 3 a centering ring which affords a sufficiently exact fixation of the blade when the propeller is stationary, and also acts as a counter-bearing surface for taking up stray forces. In normal working this counter-bearing surface is not loaded as the resultant of the forward driving thrust and the centrifugal force of the blade passes through the thrust bearing within the bearing ball race so that this forms the single bearing and is held always abutting without lost motion.

Having now particularly described and ascertained my said invention, what I claim and desire to secure by Letters Patent of the United States is:

1. In an adjustable aerial propeller, in combination, a shaft; a nave comprising a body adapted to be fixed upon said shaft; hollow blade shank sleeves for the blades, provided with outwardly directed flanges, and a thrust ball bearing cooperating with the outer face of each of said flanges and fastened to said nave body, each of said thrust bearings being so large in diameter as to include the resultant of the centrifugal force and air thrust acting upon the blade and to be able without the aid of additional bearings to hold the blade in the manner of a turntable.

2. In an adjustable aerial propeller, in combination, a shaft; a nave comprising a plate like body adapted to be fixed upon said shaft; hollow blade shank sleeves for the blades provided with outwardly directed flanges at their ends nearest to the faces of said body; and a thrust ball bearing cooperating with the outer face of each of said flanges and fastened to the nave body by connecting bolts passing outside said body and connecting said thrust bearings to each other, each of said thrust bearings being so large in diameter as to include the resultant of the centrifugal force and air thrust acting upon the blade, and to be able, without the aid of additional bearings, to hold the blade in the manner of a turntable.

3. In an adjustable aerial propeller, in combination, a shaft; a nave comprising a plate like body adapted to be fixed upon said shaft; hollow blade shank sleeves for the blades provided with outwardly directed flanges at their ends nearest to the faces of said body; a thrust ball bearing cooperating with the outer face of each of said flanges, and into which fits the end of a blade, said thrust ball bearing being fastened to the nave body by connecting bolts passing outside said body and connecting said thrust bearings to each other, the said hollow blade shank sleeves being expanded at their ends which fit into said thrust bearings; wooden blade shanks fitting into said sleeves; and circular wedges inserted into said wooden blade shanks so as to expand their ends and secure them in the said sleeves.

In witness whereof I affix my signature.

ERWIN WESNIGK.

Witnesses:
HANS BORCHARD,
MARIA SIEGER.